(12) United States Patent
Hirano et al.

(10) Patent No.: US 11,958,432 B2
(45) Date of Patent: Apr. 16, 2024

(54) IGNITER HOLDING STRUCTURE

(71) Applicant: Daicel Corporation, Osaka (JP)

(72) Inventors: Mikio Hirano, Tokyo (JP); Atsushi Mitsunabe, Tokyo (JP); Kazuhiro Kato, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 56 days.

(21) Appl. No.: 17/638,183

(22) PCT Filed: Aug. 5, 2020

(86) PCT No.: PCT/JP2020/030025
§ 371 (c)(1),
(2) Date: Feb. 25, 2022

(87) PCT Pub. No.: WO2021/039328
PCT Pub. Date: Mar. 4, 2021

(65) Prior Publication Data
US 2022/0324411 A1 Oct. 13, 2022

(30) Foreign Application Priority Data
Aug. 30, 2019 (JP) ................................. 2019-158996

(51) Int. Cl.
*B60R 21/26* (2011.01)
*B60R 21/264* (2006.01)

(52) U.S. Cl.
CPC .. *B60R 21/264* (2013.01); *B60R 2021/26029* (2013.01)

(58) Field of Classification Search
CPC ........... B60R 2021/26029; B60R 2021/26076; B60R 2021/26088
See application file for complete search history.

(56) References Cited

U.S. PATENT DOCUMENTS 7,540,241 B2 6/2009 Bierwirth
10,663,268 B2 * 5/2020 Oda ...................... B60R 21/264
(Continued)

FOREIGN PATENT DOCUMENTS

DE 20 2005 007 611 U1 10/2005
DE 19980028 B4 * 2/2008 ................ F42B 3/18
(Continued)

OTHER PUBLICATIONS

Office Action dated Nov. 9, 2022 in German Patent Application No. 11 2020 004 104.2, 6 pages. (Submitting English Translation only).
(Continued)

*Primary Examiner* — Barry Gooden, Jr.
(74) *Attorney, Agent, or Firm* — XSENSUS LLP

(57) ABSTRACT

An igniter holding structure includes, an igniter provided with an ignition portion and a conductive pin, a first resin portion provided between the igniter and an attachment portion and holds the igniter such that the ignition portion and a distal end of the conductive pin are located opposite each other, and a second resin portion provided in a circumferential wall portion of the attachment portion and forming a connector insertion portion on an inner side of the circumferential wall portion, the connector insertion portion being a space into which a connector connected to the conductive pin can be inserted and the second resin portion being provided separated from the first resin portion on the inner side of the circumferential wall portion in a manner that an exposed surface, which is made of metal and exposed to the connector insertion portion, is formed in the circumferential wall portion.

22 Claims, 11 Drawing Sheets

(56) References Cited

U.S. PATENT DOCUMENTS

| | | | | |
|---|---|---|---|---|
| 10,663,269 B2* | 5/2020 | Gordon | ................ | B60R 16/023 |
| 2004/0112244 A1* | 6/2004 | Barker | .............. | H01R 13/7032 |
| | | | | 102/530 |
| 2005/0121894 A1* | 6/2005 | Brisighella | ............ | B60R 21/26 |
| | | | | 280/741 |
| 2006/0254454 A1 | 11/2006 | Bierwirth | | |
| 2013/0255528 A1 | 10/2013 | Ozaki | | |
| 2013/0276660 A1* | 10/2013 | Ukita | ...................... | B60R 21/26 |
| | | | | 102/530 |
| 2016/0169640 A1* | 6/2016 | Schwuchow | .......... | B23P 19/00 |
| | | | | 102/275.12 |
| 2016/0223301 A1* | 8/2016 | Yamauchi | ............. | B60R 21/264 |
| 2019/0184931 A1* | 6/2019 | Prima | ...................... | F42B 3/04 |
| 2019/0293394 A1* | 9/2019 | Oda | ....................... | B60R 21/26 |
| 2019/0360787 A1* | 11/2019 | Gordon | .................... | F42B 3/26 |

FOREIGN PATENT DOCUMENTS

| | | | |
|---|---|---|---|
| DE | 10 2008 052 399 A1 | 4/2010 | |
| DE | 102017108176 A1 * | 10/2018 | |
| FR | 2984253 A1 * | 6/2013 | ......... B60R 21/2644 |
| JP | 2013-227010 A | 11/2013 | |
| WO | WO-0131282 A1 * | 5/2001 | ......... B60R 21/2644 |

OTHER PUBLICATIONS

International Search Report dated Oct. 13, 2020 in corresponding PCT/JP2020/030025, 6 pp.
Written Opinion of the ISA dated Oct. 13, 2020 in corresponding PCT/JP2020/030025, 6 pp.

* cited by examiner

IGNITER HOLDING STRUCTURE

CROSS-REFERENCE TO RELATED APPLICATIONS

The present application is based on PCT filing PCT/JP2020/030025, filed Aug. 5, 2020, which claims priority to Japanese Patent Applications No. 2019-158996, filed on Aug. 30, 2019, the entire contents of each are incorporated herein by reference.

TECHNICAL FIELD

The present invention relates to an igniter holding structure of a gas generator.

BACKGROUND ART

An igniter is used as a starting device of a gas generator for an airbag or a gas generator for a seat belt retractor, and mainly an electric igniter, which is operated by an ignition current, is widely known. A structure in which an igniter is attached to a cylindrical member provided to a housing with a resin provided therebetween has been known as a structure for attaching the igniter to the gas generator.

In this regard, in a gas generator described in Patent Document 1, a cylindrical attachment portion to which an igniter is attached is formed in a center portion of a bottom plate of a housing, and the igniter is fixed to one end side of the attachment portion with a resin provided between the igniter and the attachment portion. This resin forms further a space, into which a connector for supplying a current to the igniter is inserted, on the other end side of the attachment portion.

In a gas generator described in Patent Document 2, further, a conductive member is embedded in the resin, the conductive member is exposed to an insertion space of the connector, so that the conductive member comes into contact with a ground terminal of the connector. According to this, accumulation of static electricity in a metal housing is suppressed, and a malfunction of the igniter is prevented. Furthermore, in the gas generator of Patent Document 2, by forming a groove through which a resin material flows at the time of injection molding in the conductive member, the resin for holding the igniter and the resin for forming the insertion space of the connector are connected to each other inside the attachment portion and are formed integrally.

CITATION LIST

Patent Document

Patent Document 1: U.S. Pat. No. 7,540,241
Patent Document 2: JP 2013-227010 A

SUMMARY OF INVENTION

Technical Problem

As in the related art, in the structure in which the igniter is attached via the resin, when the resin for holding the igniter and the resin for forming the insertion space of the connector are connected inside the attachment portion while sufficiently securing the insertion space of the connector, a portion in which the resins are connected is likely to be formed thin along an inner surface of the attachment portion. Therefore, there is a concern that the strength of the portion is reduced, and damage to the resin is likely to occur. Furthermore, some kinds of the resins have a property of absorbing moisture. In this case, the resins tend to absorb the moisture when the resin is thin. Therefore, when a thin portion is formed in the resin, there is also a concern that the moisture easily enters the inside of the gas generator through the thin portion. When the moisture enters the inside of the gas generator, a gas generating agent accommodated in the gas generator is hardly maintained in a dry state, and performance of the gas generator may become unstable.

The technology of the present disclosure has been made in consideration of the problems described above, and an object of the present disclosure is to provide a technology for suppressing damage of the resin and entering of moisture in the igniter holding structure for a gas generator in order to attach the igniter to the metal attachment portion via the resin.

Solution to Problem

To achieve the above object, in the igniter holding structure of the present disclosure, the resin for holding the igniter and the resin for forming the insertion space of the connector are separated from one another inside the attachment portion, and this suppresses reduction in thickness of the resin inside the attachment portion.

More specifically, a technology of the present disclosure provides an igniter holding structure for a gas generator, used for attaching an igniter to an attachment portion, made of metal, the attachment portion including a through hole through which the igniter penetrates, and a circumferential wall portion including an inner surface of the through hole, the igniter holding structure including: the igniter including an ignition portion including an ignition agent and a conductive pin extending from the ignition portion; a first resin portion made of a resin provided between the igniter and the attachment portion, and holding the igniter, in a manner that the ignition portion and a distal end of th -conductive pin are located opposite each other across the through hole and the conductive pin is surrounded by the circumferential wall portion; and a second resin portion made of a resin and provided on the circumferential wall portion in a manner that a connector insertion portion is formed on an inner side of the circumferential wall portion, the connector insertion portion being a space for allowing a connector to be connected to the conductive pin to be inserted, in which the second resin portion is provided separated from the first resin portion on the inner side of the circumferential wall portion in a manner that an exposed surface made of metal and exposed to the connector insertion portion is formed in the circumferential wall portion.

According to the igniter holding structure of the present disclosure, by preventing the resin for holding the igniter from being connected to the resin for forming the insertion space of the connector on the inner side of the circumferential wall portion, that is, on the inner side of the attachment portion, the formation of the thin portion of the resin on the inner side of the attachment portion can be suppressed. As a result, strength of the resin on the inner side of the attachment portion can be ensured and damage to the resin can be suppressed. Furthermore, entering of moisture into the gas generator due to the resin formed thin can be suitably suppressed. More specifically, the entering of moisture through the thin portion of the resin into a vicinity of the igniter, that is, the combustion chamber which is a space in which the gas generating agent combusted by the igniter is accommodated can be suitably suppressed. As a result, the dry state of the gas generating agent in the combustion chamber is suitably maintained, and thus the performance of the gas generator can be stabilized.

Note that, the igniter holding structure of the present disclosure can be applied to a gas generator for an airbag and a gas generator for a seat belt retractor. Furthermore, the applied gas generator may be a single type gas generator provided with only one igniter, or may be a dual type gas generator provided with two igniters. Furthermore, the attachment portion may be formed with a part of the housing included in the gas generator, or may be formed as a separate collar. Furthermore, the igniter holding structure is not limited to a state in which the igniter holding structure is incorporated into the gas generator, and an igniter assembly obtained by combining the igniter holding structure including the igniter, the first resin portion, and the second resin portion, and the collar as the attachment portion can be obtained.

Furthermore, in the igniter holding structure described above, the exposed surface may be formed as a part of the circumferential wall portion exposed to the connector insertion portion by the second resin portion separating from the first resin portion on the inner side of the circumferential wall portion. According to this, since it is not necessary to provide parts for forming the exposed surface separately from the circumferential wall portion, an increase in the number of parts and assembly man-hours can be suppressed.

Furthermore, in the igniter holding structure described above, a connection hole extending through from a side of the first resin portion to a side of the second resin portion across the circumferential wall portion, may be formed in the attachment portion in addition to the through hole, and the first resin portion and the second resin portion may be connected to each other inside the connection hole. According to this, the resin connecting the first resin portion to the second resin portion inside the connection hole engages with the inner surface of the connection hole, and rotation of the first resin portion and the second resin portion with respect to the attachment portion can be suppressed. Furthermore, from viewpoint of manufacturing the igniter holding structure, in a case where the first resin portion and the second resin portion are molded by injection molding, the resin material that has flowed into a molding die from one of the side of the first resin portion and the side of the second resin portion can flow into the other side through the connection hole. According to this, since the first resin portion and the second resin portion can be simultaneously molded by single injection molding, the man-hours can be reduced. Furthermore, since any one of a gate for pouring the resin material from the side of the first resin portion and a gate for pouring the resin material from the side of the second resin portion is only required, the manufacturing equipment can be simplified.

Furthermore, in the igniter holding structure described above, the circumferential wall portion includes a deep-side circumferential wall portion in which the exposed surface is formed, and a front-side circumferential wall portion formed on a more front side than the deep-side circumferential wall portion in an insertion direction of the connector with respect to the connector insertion portion and extending toward the outside of the circumferential wall portion further than the exposed surface, and the second resin portion is provided on the front-side circumferential wall portion in a manner that insertion of the connector into the connector insertion portion is not hindered. In this way, by providing the second resin portion on the front-side circumferential wall portion that extends toward the outside of the circumferential wall portion further than the exposed surface, that is, by providing the second resin portion in a wide space, the second resin portion can be formed thick while sufficiently ensuring the size of the connector insertion portion. As a result, the strength of the second resin portion can be increased.

Moreover, in the igniter holding structure, a connector introduction surface, which is a surface facing the connector in the second resin portion, may be formed to be flush with the exposed surface. According to this, without being hindered by the exposed surface, the connector can be guided to the side (exposed surface side) deeper than the connector introduction surface without delay, and the connector can be smoothly inserted into the connector insertion portion.

Furthermore, in the igniter holding structure, a stepped portion is formed between the exposed surface and the connector introduction surface, in a manner that the connector introduction surface is located inward of the circumferential wall portion further than the exposed surface, and the stepped portion is formed in a manner that, in a case where the connector is inserted into the connector insertion portion, a protrusion protruding from the connector engages with the stepped portion, and this engagement restricts the connector from being removed from the connector insertion portion. According to this, the step formed between the exposed surface and the connector introduction surface can be used as a stopper of the connector.

Furthermore, in the igniter holding structure described above, the exposed surface is formed in a manner that, in a case where the connector provided with a ground terminal is inserted into the connector insertion portion, the exposed surface may be allowed to come into contact with the ground terminal. Here, the ground terminal refers to a terminal electrically connected to an external ground circuit. In this way, according to the igniter holding structure, since the metal exposed surface comes into contact with the ground terminal, the attachment portion provided with the exposed surface is electrically connected to the ground terminal. According to this, in a case where an electric charge is accumulated in the housing of the gas generator, the electric charge flows to the ground circuit from the attachment portion via the ground terminal. As a result, the electric charge of the gas generator can be safely discharged and a malfunction of the igniter due to static electricity can be prevented. For example, in a case where the attachment portion is formed in a part of the housing, the electric charge accumulated in the housing is safely discharged. However, the igniter holding structure of the present disclosure may not correspond to the connector provided with the ground terminal, and may be connected to the connector that does not include the ground terminal. That is, the exposed surface may not be allowed to come into contact with the ground terminal of the connector.

Furthermore, in the igniter holding structure described above, the first resin portion includes: a holding portion holding the igniter in a manner that the ignition portion and the distal end of the conductive pin are located opposite each other across the through hole, and the conductive pin is surrounded by the circumferential wall portion; and a cylindrical portion formed in a cylindrical shape, including one end portion connected to the holding portion and the other end portion that is closed, and including a combustion chamber in which a part of the ignition portion is accommodated and a gas generating agent to be combusted by operation of the ignition portion is accommodated, formed with the ignition portion, and the holding portion and the cylindrical portion are integrally formed. According to this, since the combustion chamber is formed with a part of the first resin portion (cylindrical portion), the number of parts and the assembly man-hours can be reduced more than those of a case where the combustion chamber is formed with a separate member. Moreover, since the combustion chamber is formed inside the first resin portion, the moisture can be prevented from being transmitted between the attachment portion and the first resin portion and entering into the combustion chamber.

Advantageous Effects of Invention

According to the technology of the present disclosure, in the igniter holding structure for a gas generator, damage to the resin and entering of the moisture can be suppressed.

DESCRIPTION OF EMBODIMENTS

A gas generator according to an embodiment of the present disclosure will be described below with reference to the drawings. Note that each of the configurations, combinations thereof, and the like in each embodiment is an example, and various additions to the configuration, omissions, substitutions, and other changes may be made as appropriate without departing from the spirit of the present invention. The present invention is not limited by the embodiments and is limited only by the claims.

First Embodiment

In a first embodiment, a case where an igniter holding structure of the present disclosure is applied to a gas generator for an airbag will be described.

Overall Configuration

Figure 1:
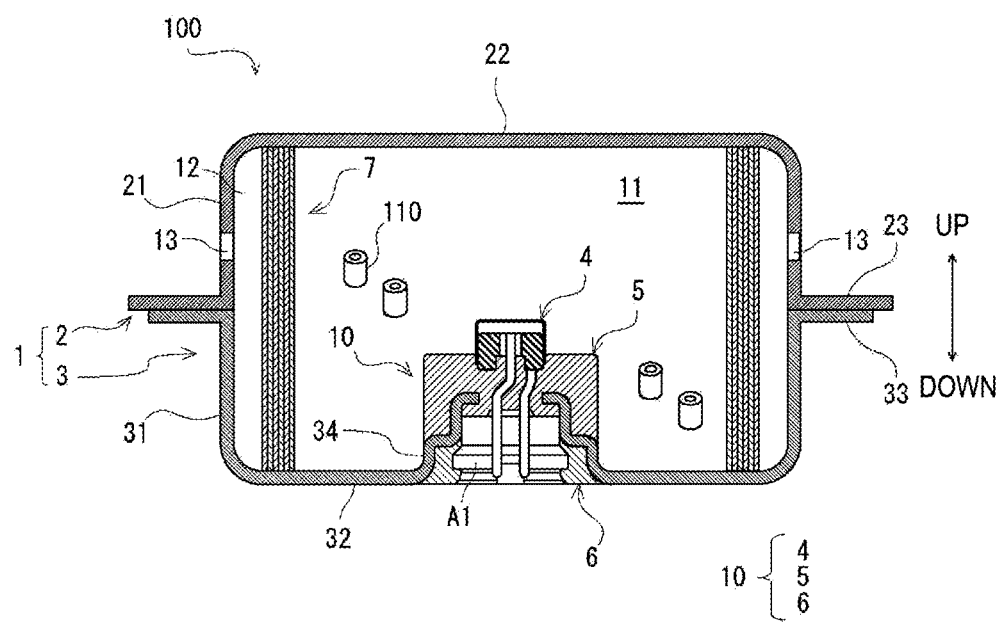
FIG. 1 is an axial cross-sectional view of a gas generator including an igniter holding structure according to a first embodiment.

FIG. 1 is an axial cross-sectional view of the gas generator including the igniter holding structure according to the first embodiment. A gas generator 100 is configured as a so-called single type gas generator including one igniter denoted by a reference numeral 4. Specifically, as illustrated in FIG. 1, the gas generator 100 includes a housing 1, an igniter 4, a first resin portion 5, a second resin portion 6, and a filter 7. The gas generator 100 is configured to inflate an airbag (not illustrated) by operating the igniter 4 to combust a gas generating agent 110 accommodated in the housing 1, and then discharging combustion gas which is a combustion product thereof from a gas discharge port 13 formed in the housing 1. As illustrated in FIG. 1, the igniter 4 is attached to the housing 1 in a state of being held by the first resin portion 5. Furthermore, the second resin portion 6 forms a connector insertion portion A1 that is a space into which a connector 200 (see FIG. 3) for supplying power (ignition current) to the igniter 4 can be inserted. In the present specification, a structure for attaching the igniter 4 to the housing 1, which includes the igniter 4, the first resin portion 5, and the second resin portion 6, is referred to as an igniter holding structure 10. Each configuration of the gas generator 100 will be described below.

Housing

As illustrated in FIG. 1, the housing 1 is formed in a short cylindrical shape with both ends in an axial direction closed by joining an upper shell 2 and a lower shell 3 each formed of metal in a bottomed cylindrical shape in a state in which the respective opening ends face each other. However, the configurations of the upper shell 2 and the lower shell 3 are not limited thereto, and known configurations can be appropriately used. Here, a direction along the axial direction of the housing 1 is defined as a vertical direction of the gas generator 100, where the upper shell 2 side (that is, the upper side in FIG. 1) is defined as an upper side of the gas generator 100, and the lower shell 3 side (that is, the lower side in FIG. 1) is defined as a lower side of the gas generator 100.

The upper shell 2 includes an upper cylinder portion 21 having a cylindrical shape and a top plate portion 22 that closes the upper end of the upper cylinder portion 21. The top plate portion 22 has a generally circular shape when viewed from above. The upper cylinder portion 21 extends generally perpendicularly from a circumferential edge of the top plate portion 22 to form a circumferential wall having a cylindrical shape. The top plate portion 22 is connected to an upper end side of the upper cylinder portion 21, and a lower end side of the upper cylinder portion 21 forms an opening. Furthermore, a joining portion 23 extending radially outward is connected to the lower end portion of the upper cylinder portion 21. The lower shell 3 includes a lower cylinder portion 31 having a cylindrical shape and a bottom plate portion 32 that closes a lower end of the lower cylinder portion 31. Similar to the top plate portion 22 of the upper shell 2, the bottom plate portion 32 has a generally circular shape when viewed from above. A joining portion 33 extending radially outward is connected to an upper end portion of the lower cylinder portion 31. The joining portion 23 of the upper shell 2 and the joining portion 33 of the lower shell 3 form the housing 1 by being overlapped and joined by laser welding or the like. Furthermore, a plurality of the gas discharge ports 13 communicating with the inside and the outside of the housing 1 are formed side by side along a circumferential direction in the upper cylinder portion 21 of the upper shell 2. The gas discharge port 13 is closed by a seal tape (not illustrated).

Figure 2:
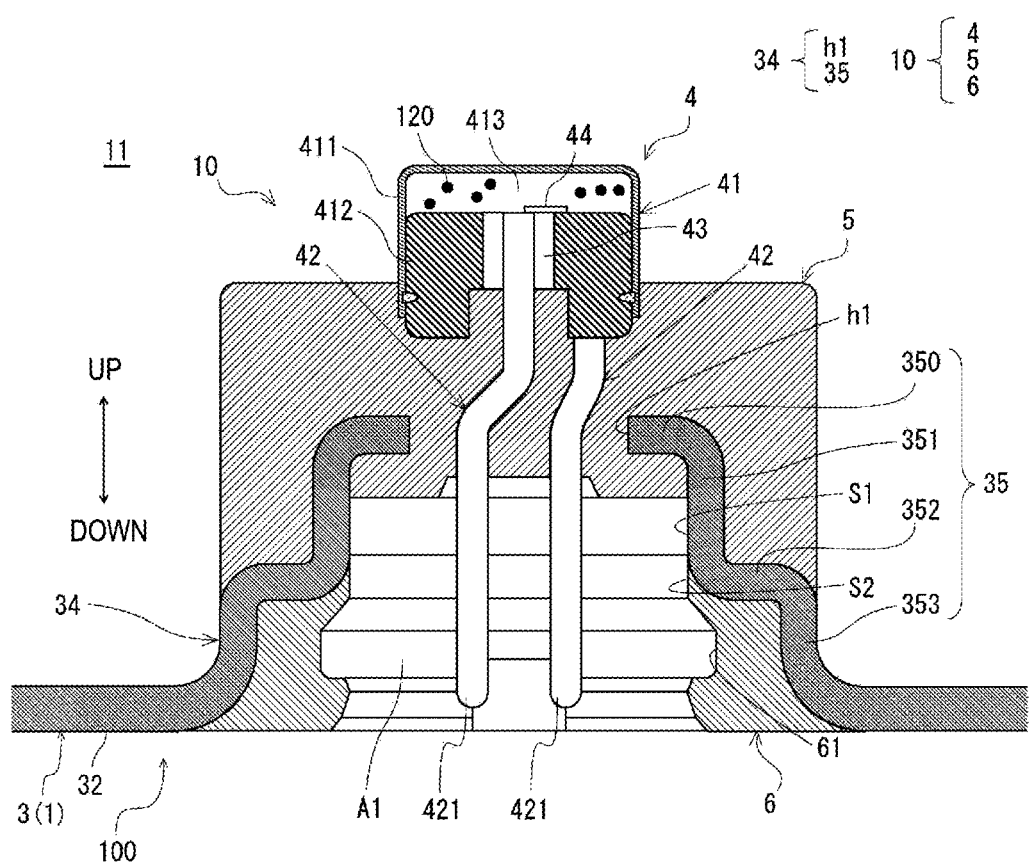
FIG. 2 is an axial cross-sectional view illustrating a vicinity of an igniter holding structure in a gas generator according to the first embodiment.

Here, as illustrated in FIG. 1, the lower shell 3 of the housing 1 is provided with an attachment portion 34 to which the igniter 4 is attached. In the present embodiment, the attachment portion 34 is formed integrally with the bottom plate portion 32. In other words, the attachment portion 34 is formed with a part of the housing 1. Therefore, the attachment portion 34 is made of metal. FIG. 2 is an axial cross-sectional view illustrating a vicinity of the igniter holding structure 10 in the gas generator 100 according to the first embodiment. As illustrated in FIG. 2, the attachment portion 34 is formed in a substantially cylindrical shape with a part of the lower shell 3 protruding upward from the bottom plate portion 32. A through hole h1 through which a conductive pin 42 of the igniter 4 penetrates is formed in an upper end portion of the attachment portion 34, and a circumferential wall portion 35 including an inner surface of the through hole h1 extends from the circumferential edge of the through hole h1 to be connected to the bottom plate portion 32. More specifically, the circumferential wall portion 35 includes a hole forming portion 350 including the inner surface of the through hole h1 and extending radially outward of the through hole h1, a cylindrical deep-side circumferential wall portion 351 extending downward from an outer circumferential end portion of the hole forming portion 350, a connecting portion 352 extending radially outward from a lower end portion of the deep-side circumferential wall portion 351, and a cylindrical front-side circumferential wall portion 353 extending downward from an outer circumferential end portion of the connecting portion 352 and connecting to the bottom plate portion 32. As illustrated in FIG. 2, the front-side circumferential wall portion 353 is formed with an inner diameter larger than an inner diameter of the deep-side circumferential wall portion 351. By connecting the deep-side circumferential wall portion 351 to the front-side circumferential wall portion 353, the connecting portion 352 forms an annular step between the deep-side circumferential wall portion 351 and the front-side circumferential wall portion 353. Note that, in the following description, an inner side of the circumferential wall portion 35 and an inner side of the attachment portion 34 refer to the inside of a region surrounded by the circumferential wall portion 35, and also include the inner side of the through hole h1. Furthermore, the inner surface of the circumferential wall portion 35 refers to a wall surface facing inward in the circumferential wall portion 35, and also includes an inner surface of the through hole h1. As illustrated in FIG. 2, by connecting the inner surface of the circumferential wall portion 35 and a lower surface of the bottom plate portion 32, a lower end portion of the circumferential wall portion 35 opens to a lower space of the housing 1. Note that, in the present example, the connecting portion 352 of the circumferential wall portion 35 forms a horizontally extending surface, but the connecting portion 352 may form an annular inclined surface connecting the deep-side circumferential wall portion 351 and the front-side circumferential wall portion 353. Furthermore, instead of the connecting portion 352 and the front-side circumferential wall portion 353, the circumferential wall portion 35 may have a circumferential wall that forms an annular inclined surface from a lower end of the deep-side circumferential wall portion 351 to the bottom plate portion 32.

Filter

The filter 7 is formed in a cylindrical shape, and disposed between the igniter 4 and the gas discharge port 13 in a state in which an upper end portion is supported by the top plate portion 22 of the upper shell 2 and a lower end portion is supported by the bottom plate portion 32 of the lower shell 3, as illustrated in FIG. 1. A combustion chamber 11 is formed between the igniter 4 and the filter 7. The gas generating agent 110 combusted by operation of the igniter 4 is accommodated in the combustion chamber 11. Furthermore, an annular gap 12 is formed between the filter 7 and the housing 1 (upper cylinder portion 21 and the lower cylinder portion 31). The filter 7 is configured to allow combustion gas to pass through the filter 7, and the combustion gas generated in the combustion chamber 11 is cooled by passing through the filter 7. At this time, the filter 7 filters the combustion gas by collecting the combustion residue of the combustion gas.

Gas Generating Agent

As the gas generating agent 110 accommodated in the combustion chamber 11, a gas generating agent with a known composition can be used. As the gas generating agent 110, for example, in a case where a gas generating agent having a relatively low combustion temperature is used, a known gas generating agent formed of guanidine nitrate (41 wt. %), basic copper nitrate (49 wt. %), and a binder or an additive can be used. Furthermore, various shapes such as a granular shape, a pellet shape, a columnar shape, a disk shape, and the like can be adopted for the gas generating agent 110.

Igniter Holding Structure

Figure 3:
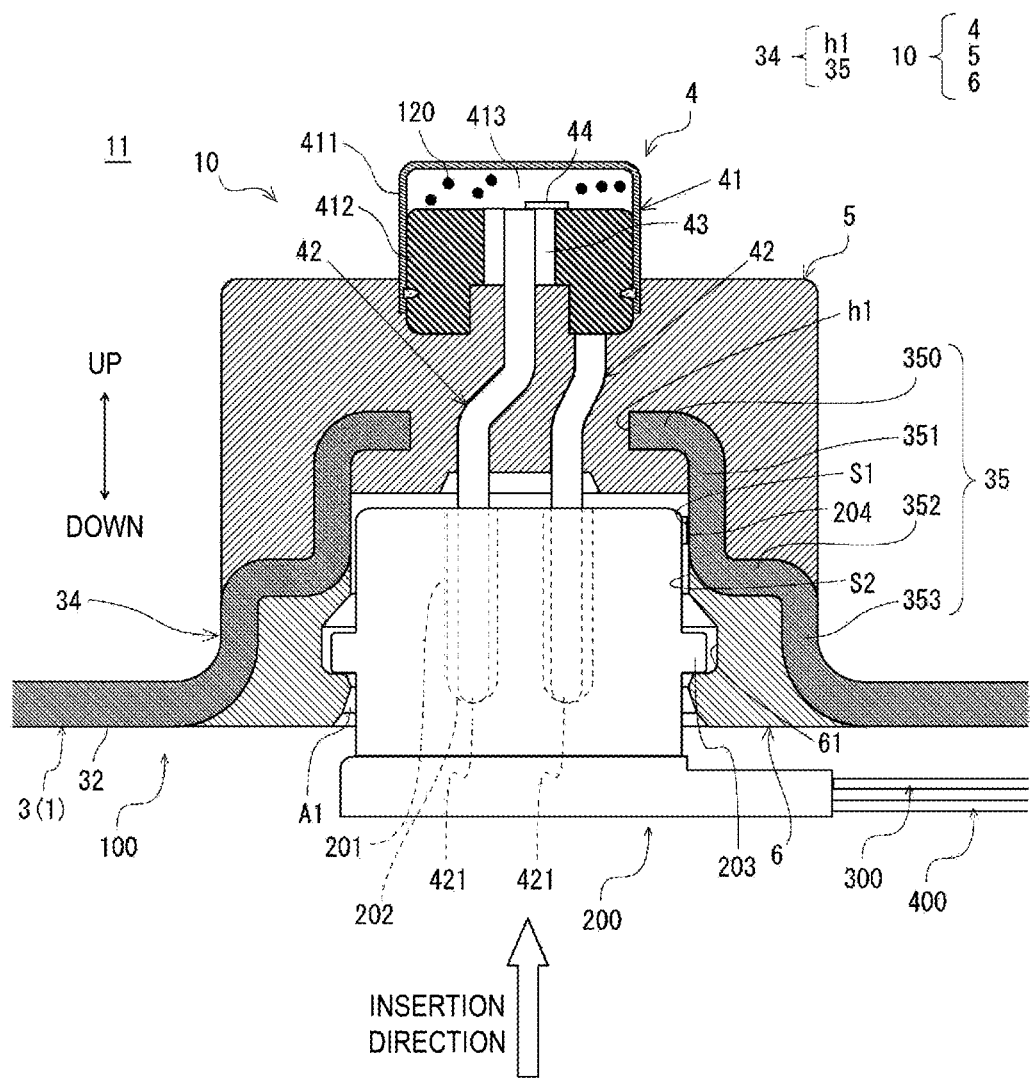
FIG. 3 is an axial cross-sectional view illustrating a state in which a connector is connected to a gas generator according to the first embodiment.

As illustrated in FIG. 2, the igniter holding structure 10 includes the igniter 4 that combusts the gas generating agent 110, the first resin portion 5 that is made of a resin and holds the igniter 4, and a second resin portion 6 that is made of a resin and forms the connector insertion portion A1, the connector insertion portion A1 being a space into which the connector 200 can be inserted. FIG. 3 is an axial cross-sectional view illustrating a state in which the connector 200 is connected to the gas generator 100 according to the first embodiment. The connector 200 is connected to a power supply lead wire 300 connected to an external power source (not illustrated) for supplying power to the gas generator 100, and a ground lead wire 400 connected to a ground circuit (not illustrated) for discharging an electric charge accumulated in the gas generator 100. This connector 200 is inserted into the connector insertion portion A1 from below the gas generator 100. In other words, in the present example, an insertion direction, which is a direction in which the connector 200 is inserted into the connector insertion portion A1, matches with an upward direction illustrated in FIG. 3 and the like.

As illustrated in FIGS. 2 and 3, in the igniter holding structure 10, the first resin portion 5 and the second resin portion 6 are provided separated from each other across the circumferential wall portion 35. In the igniter holding structure 10 according to the present embodiment, by the first resin portion 5 and the second resin portion 6 separating from each other on the inner side of the circumferential wall portion 35, strength of the resin in the igniter holding structure 10 is ensured, and the entering of moisture into the inside of the gas generator 100 can be suppressed. Each configuration of the igniter holding structure 10 will be described below with reference to FIGS. 2 and 3.

Igniter

As illustrated in FIGS. 2 and 3, the igniter 4 includes an ignition portion 41 including an ignition agent 120 for igniting the gas generating agent 110, and a pair of conductive pins 42 and 42 extending downward from the ignition portion 41. The connector 200 is connected to a pair of the conductive pins 42 and 42. The igniter 4 ignites the ignition agent 120 of the ignition portion 41 and ignites the gas generating agent 110 accommodated in the combustion chamber 11 by being operated by power supplied to each of the conductive pins 42 from the external power source via the connector 200. The ignition portion 41 includes a bottomed cylindrical cup body 411 including an upper end closed and a lower end opened, and a columnar metal header 412 disposed to close an opening formed in the lower end of the cup body 411. An outer circumferential surface of the metal header 412 is welded to the inner wall of the cup body 411. The ignition agent 120 for combusting the gas generating agent 110 is accommodated in an ignition chamber 413 which is a space defined by the cup body 411 and the metal header 412. A through hole that extends through the metal header 412 vertically is formed in a central portion of the metal header 412. One of a pair of the conductive pins 42 and 42 is joined to the metal header 412 via an insulator 43 in a state of being inserted into the through hole of the metal header 412. Furthermore, a bridge wire 44, which is a resistor that electrically connects one of the conductive pins 42 with the metal header 412, is wired to a bottom portion of the ignition chamber 413. The other of the pair of the conductive pins 42 and 42 is joined to a lower surface of the metal header 412. Hereinafter, when each of a pair of the conductive pins 42 and 42 is not differentiated, it is simply referred to as a conductive pin 42.

First Resin Portion

The first resin portion 5 is formed of a resin material and is provided between the igniter 4 and the attachment portion 34 to fix the igniter 4 to the attachment portion 34. At this time, as illustrated in FIGS. 2 and 3, the first resin portion 5 holds the igniter 4 in a manner that the ignition portion 41 and a distal end 421 of the conductive pin 42 are located opposite each other across the through hole h1 of the attachment portion 34 and the conductive pin 42 is surrounded by the circumferential wall portion 35 of the attachment portion 34. In other words, the igniter 4 is held by the first resin portion 5 in a manner that the ignition portion 41 is located on the upper side of the through hole h1 and the distal end 421 of the conductive pin 42 is located on the lower side of the through hole h1.

The first resin portion 5 covers the hole forming portion 350, the deep-side circumferential wall portion 351, and the connecting portion 352 on an outer side of the circumferential wall portion 35, and covers the hole forming portion 350 (including the inner surface of the through hole h1) and a part of the deep-side circumferential wall portion 351. Furthermore, with respect to the igniter 4, the first resin portion 5 covers a lower portion of the ignition portion 41 and an upper portion of the conductive pin 42 in a manner that a part of the ignition portion 41 including an upper end portion of the cup body 411 is exposed to the combustion chamber 11, and a part of the conductive pin 42 including the distal end 421 is exposed to the connector insertion portion A1.

Here, as illustrated in FIG. 3, a pin insertion hole 201, into which the conductive pin 42 is inserted when the connector 200 is inserted into the connector insertion portion A1, is formed in the connector 200, and a conductive terminal 202 connected to the power supply lead wire 300 is provided inside the pin insertion hole 201. As illustrated in FIG. 3, when the connector 200 is inserted into the connector insertion portion A1, the conductive pin 42 inserted into the pin insertion hole 201 comes into contact with the conductive terminal 202. When the conductive pin 42 comes into contact with the conductive terminal 202, the connector 200 is connected to the igniter 4 and is in a state in which power can be supplied to the igniter 4.

The first resin portion 5 is formed by injection-molding a resin material. As the resin material forming the first resin portion 5 a thermoplastic resin commonly used for injection molding can be used, such as polybutylene terephthalate resin, polyethylene terephthalate resin, polyamide resin, polypropylene sulfide resin, and polypropylene oxide resin. Note that, a range in which the first resin portion 5 is disposed is not limited to FIGS. 2 and 3. For example, on the outer side of the circumferential wall portion 35, the first resin portion may cover only the hole forming portion 350, and an outer circumferential surface of the deep-side circumferential wall portion 351 and an outer circumferential surface of the connecting portion 352 may be exposed. Furthermore, the first resin portion 5 may cover only the hole forming portion 350 on the inner side of the circumferential wall portion 35.

Second Resin Portion

The second resin portion 6 is formed of a resin material and provided on the inner side of the circumferential wall portion 35. According to this, the connector insertion portion A1, which is a space into which the connector 200 can be inserted, is formed on the inner side of the circumferential wall portion 35, as illustrated in FIGS. 2 and 3. The second resin portion 6 is formed in a cylindrical shape or an annular shape in a manner that it covers the connecting portion 352 and the front-side circumferential wall portion 353 on the inner side of the circumferential wall portion 35, and the connector insertion portion A1 is formed with an inner surface of the second resin portion 6. Here, as illustrated in FIG. 3, a protrusion 203 that protrudes toward the outer side of the circumferential wall portion 35 is formed in the connector 200 in a state in which the connector 200 is inserted into the connector insertion portion A1. Corresponding to the protrusion 203, the inner surface of the second resin portion 6 is partially recessed outward, and an engagement recess 61, which engages with the protrusion 203 of the connector 200 inserted into the connector insertion portion A1, is formed in the inner surface of the second resin portion 6. In a process in which the connector 200 is inserted into the connector insertion portion A1, the connector 200 is inserted while the protrusion 203 is elastically deformed, and the protrusion 203 is restored outward again when the protrusion 203 reaches the engagement recess 61. Therefore, when the insertion of the connector 200 is completed, the protrusion 203 engages with the engagement recess 61. This restricts unintentional removal of the connector 200 from the connector insertion portion A1.

The second resin portion 6 is formed by injection-molding the resin material, and the thermoplastic resin commonly used for injection molding can be used as the resin material that forms the second resin portion 6, similar to the first resin portion 5. Note that, the first resin portion 5 and the second resin portion 6 may be formed of the same resin material or may be formed of a different resin material.

Here, as illustrated in FIGS. 2 and 3, the second resin portion 6 is provided separated from the first resin portion 5 on the inner side of the circumferential wall portion 35 in a manner that a part of the inner surface of the circumferential wall portion 35 is exposed to the connector insertion portion A1. More specifically, since the second resin portion 6 is separated from the first resin portion 5 on the inner side of the circumferential wall portion 35, a part of the deep-side circumferential wall portion 351 (portion not covered by the first resin portion 5) is exposed to the connector insertion portion A1. This portion of the inner surface of the circumferential wall portion 35 exposed to the connector insertion portion A1 is referred to as an exposed surface S1. Since the circumferential wall portion 35 is made of metal, the exposed surface S1 is a metal surface. This exposed surface S1 is formed in an annular shape. In other words, the exposed surface S1 is formed continuously around an entire circumference in an inner circumferential direction of the circumferential wall portion 35, and thus the first resin portion 5 is separated from the second resin portion 6 on the inner side of the circumferential wall portion 35. Furthermore, since the exposed surface S1 is exposed to the connector insertion portion A1, the exposed surface S1 defines the connector insertion portion A1 together with the inner surface of the second resin portion 6.

The first resin portion 5 and the second resin portion 6 are separated vertically in a manner that the exposed surface S1 is formed on the inner side of the circumferential wall portion 35. The second resin portion 6 is provided below the exposed surface S1, that is, on a front side in the insertion direction. At this time, as illustrated in FIG. 3, the second resin portion 6 is provided on the front-side circumferential wall portion 353 that extends toward the outside of the circumferential wall portion 35 further than the exposed surface S1 in a manner that the insertion of the connector 200 into the connector insertion portion A1 is not hindered.

Here, a surface facing the connector 200 inserted into the connector insertion portion A1 on the inner surface of the second resin portion 6 is referred to as a connector introduction surface S2. The connector introduction surface S2 is formed adjacent to the exposed surface S1 below the exposed surface S1 (that is, the front side in the insertion direction). The connector introduction surface S2 is a surface that guides the connector 200 to the side deeper than the connector introduction surface S2 when the connector 200 is inserted into the connector insertion portion A1. As illustrated in FIGS. 2 and 3, the connector introduction surface S2 is formed to be flush with the exposed surface S1.

Here, a ground terminal 204 exposed to the connector insertion portion A1 is formed in the connector 200 in a state in which the connector 200 is inserted into the connector insertion portion A1. The ground terminal 204 is electrically connected to the ground circuit via the ground lead wire 400. At this time, as illustrated in FIG. 3, the exposed surface S1 is formed in a manner that the ground terminal 204 of the connector 200 inserted into the connector insertion portion A1 comes into contact with the exposed surface S1. Since the exposed surface S1 is a part of the housing 1, the housing 1 is electrically connected to the ground terminal 204 by bringing the exposed surface S1 into contact with the ground terminal 204. According to this, in a case where the electric charge is accumulated in the housing 1, the electric charge flows to the ground circuit via the ground terminal 204 and the ground lead wire 400.

Operation

Next, operations of the gas generator 100 will be described. In a state in which the gas generator 100 is assembled to an automobile, the connector 200 inserted into the connector insertion portion A1 is connected to the igniter 4 as illustrated in FIG. 3, and the power can be supplied to the igniter 4. In this state, when a sensor (not illustrated) mounted in the automobile senses an impact, the power from the external power source is supplied to the conductive pin 42 via the conductive terminal 202 of the connector 200. Then, a current flows through the bridge wire 44, and the ignition agent 120 inside the ignition chamber 413 is combusted due to Joule's heat generated in the bridge wire 44. With this, a pressure in the ignition chamber 413 increases to cause the cup body 411 to rupture, and a high-temperature flame, which is a combustion product of the ignition agent 120, is discharged upward. As a result, the gas generating agent 110 of the combustion chamber 11 is ignited. Combustion gas of the gas generating agent 110 is discharged to the outside of the housing 1 from the gas discharge port 13 through the gap 12 after being cooled and filtered by the filter 7, and flows into the airbag (not illustrated). According to this, the airbag is inflated, a cushion is formed between an occupant and a hard structure, and thus the occupant is protected from the impact.

Manufacturing Method of Igniter Holding Structure

Figure 4:
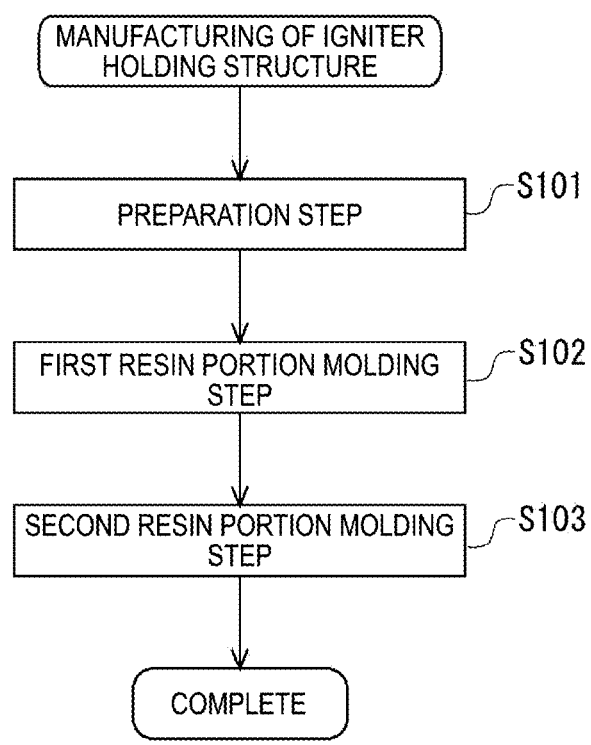
FIG. 4 is a flowchart illustrating a manufacturing process of an igniter holding structure according to the first embodiment.

Next, a manufacturing method of the igniter holding structure 10 will be described. In the manufacturing method of the igniter holding structure 10 according to the present embodiment, the first resin portion 5 and the second resin portion 6 are molded by injection molding using a molding die. In the present example, the first resin portion 5 and the second resin portion 6 are formed of the same resin material. FIG. 4 is a flowchart illustrating a manufacturing process of the igniter holding structure 10 according to the first embodiment. First, in a preparation step of Step S101, the igniter 4, the lower shell 3 including the attachment portion 34 to be attached to the igniter 4, and the resin material that is a raw material for the first resin portion 5 and the second resin portion 6 are prepared, and the igniter 4 and the lower shell 3 are disposed in a molding die. Next, in a first resin portion molding step of Step S102, the first resin portion 5 is injection-molded by melting the resin material (hereinafter, a first resin material) that is a raw material for the first resin portion 5 and curing the resin material after injection in the die. In Step S102, the first resin material in a molten state is poured from a gate for a first resin material provided in the die and then cured. As a result, the igniter 4 is fixed to the attachment portion 34 in a state of being held by the first resin portion 5. Next, in a second resin portion molding step of Step S103, the second resin portion 6 is injection-molded by melting the resin material (hereinafter, a second resin material) that is a raw material for the second resin portion 6 and curing the resin material after injection in the die. As illustrated in FIG. 2, in the igniter holding structure 10, the first resin portion 5 and the second resin portion 6 are separated from each other across the circumferential wall portion 35. Therefore, in Step S103, the second resin material in a molten state is poured from a gate for a second resin material different from the gate for a first resin material, and then cured. As a result, the connector insertion portion A1 is formed on the inner side of the circumferential wall portion 35. At this time, the second resin portion 6 is molded to be separated from the first resin portion 5 on the inner side of the circumferential wall portion 35 in a manner that the exposed surface S1 in which a part of the circumferential wall portion 35 is exposed to the connector insertion portion A1 is formed on the inner side of the circumferential wall portion 35. As described above, the igniter holding structure 10 is manufactured. Note that, in the molding of the first resin portion 5 in Step S102 and the molding of the second resin portion 6 in Step S103, which are described above, Step S103 may be performed earlier, or Step S102 and Step S103 may be performed simultaneously.

Actions and Effects

Incidentally, in the technology described in Patent Document 1 or Patent Document 2, the resin for holding the igniter and the resin for forming the insertion space for the connector are connected on the inner side of the cylindrical attachment portion provided in the housing, and these are integrally formed. However, when attempting to ensure the insertion space of the connector in the limited space on the inner side of the attachment portion, the size of the space in which the resin can be provided is limited. Therefore, as described above, when the resin for holding the igniter and the resin for forming the insertion space of the connector are connected on the inner side of the attachment portion, a portion in which the resins are connected is likely to be formed thin along the inner surface of the attachment portion. In other words, there is a possibility that the resin is formed thin on the inner side of the attachment portion. When the resin is formed thin, the strength of the resin decreases, and there is a concern that damage to the resin is likely to occur. Furthermore, some kinds of the resin material have a property of absorbing moisture. In this case, the resin tends to absorb the moisture when the resin is thin. Therefore, in the above-described technology, the moisture is transmitted through the thin portion of the resin and enters into the combustion chamber, and thus there is a possibility that the entering of the moisture affects the ignition and combustion performance of the gas generating agent accommodated in the combustion chamber.

On the other hand, in the igniter holding structure 10 according to the present embodiment, the second resin portion 6 is provided separated from the first resin portion 5 on the inner side of the circumferential wall portion 35 in a manner that the metal exposed surface S1 exposed to the connector insertion portion A1 is formed in the circumferential wall portion 35 of the attachment portion 34. In other words, the resin for holding the igniter and the resin for forming the insertion space of the connector are prevented from being connected on the inner side of the circumferential wall portion 35 (that is, on the inner side of the attachment portion 34). Therefore, the formation of the thin portion of the resin on the inner side of the attachment portion 34 can be suppressed. As a result, the strength of the resin on the inner side of the attachment portion 34 can be ensured and damage to the resin can be suppressed. Furthermore, the entering of the moisture into the combustion chamber 11 due to the resin formed thin can be suitably suppressed. As a result, the dry state of the gas generating agent 110 in the combustion chamber 11 is suitably maintained, and the performance of the gas generator 100 can be stabilized.

Moreover, in the igniter holding structure 10, since the first resin portion 5 and the second resin portion 6 are completely separated from each other across the circumferential wall portion 35, the moisture absorbed by the second resin portion 6 can be completely prevented from being transmitted to the first resin portion 5 and entering into the combustion chamber 11.

Furthermore, in the igniter holding structure 10, since the first resin portion 5 is separated from the second resin portion 6 on the inner side of the circumferential wall portion 35, the exposed surface S1 is formed as a part of the circumferential wall portion 35 exposed to the connector insertion portion A1. In this way, since the exposed surface S1 is formed for separating the first resin portion 5 from the second resin portion 6 with the circumferential wall portion 35, it is not necessary to provide parts for forming the exposed surface S1 separately from the circumferential wall portion 35 (lower shell 3), and an increase in the number of parts and the assembly man-hours can be suppressed.

Furthermore, in the gas generator 100, the circumferential wall portion 35 includes the deep-side circumferential wall portion 351 in which the exposed surface S1 is formed and the front-side circumferential wall portion 353 that is formed below the deep-side circumferential wall portion 351 (on the front side in the insertion direction) and extends toward the outside of the circumferential wall portion 35 further than the exposed surface S1, and in the igniter holding structure 10, the second resin portion 6 is provided on the front-side circumferential wall portion 353 in a manner that the insertion of the connector 200 into the connector insertion portion A1 is not hindered. In this way, by providing the second resin portion 6 on the front-side circumferential wall portion 353 that extends toward the inside of the circumferential wall portion 35 further than the exposed surface S1, that is, by providing the second resin portion 6 in a wide space, the second resin portion 6 can be formed thicker while sufficiently ensuring the size of the connector insertion portion A1. As a result, the strength of the second resin portion 6 can be increased. However, a location at which the second resin portion is provided in the igniter holding structure of the present disclosure is not limited thereto.

Moreover, in the igniter holding structure 10, the connector introduction surface S2, which is a surface facing the connector 200 in the second resin portion 6, is formed to be flush with the exposed surface S1. Accordingly, without being hindered by the exposed surface S1, the connector 200 can be guided to the side (exposed surface S1 side) deeper than the connector introduction surface S2 without delay, and the connector 200 can be smoothly inserted into the connector insertion portion A1.

Moreover, in the igniter holding structure 10, in a case where the connector 200 provided with the ground terminal 204 is inserted into the connector insertion portion A1, the exposed surface S1 is allowed to come into contact with the ground terminal 204. In this way, since the metal exposed surface S1 comes into contact with the ground terminal 204, the housing 1 provided with the exposed surface S1 is electrically connected to the ground terminal 204. According to this, in a case where the electric charge is accumulated in the housing 1, the electric charge flows to the ground circuit via the ground terminal 204 and the ground lead wire 400. As a result, the electric charge of the housing can be safely discharged and a malfunction of the igniter 4 due to static electricity can be prevented. However, the igniter holding structure of the present disclosure may not correspond to the connector provided with the ground terminal, and may be connected to the connector that does not include the ground terminal. That is, the exposed surface may not be allowed to come into contact with the ground terminal of the connector.

Note that, in the igniter holding structure of the present disclosure, the exposed surface may not be formed in the deep-side circumferential wall portion described above. In the igniter holding structure of the present disclosure, the first resin portion and the second resin portion may be separated from each other on the inner side of the circumferential wall portion, for example, the first resin portion and the second resin portion are separated from each other in a manner that the exposed surface is formed with an inner surface of the through hole.

FIRST MODIFIED EXAMPLE

Figure 5:
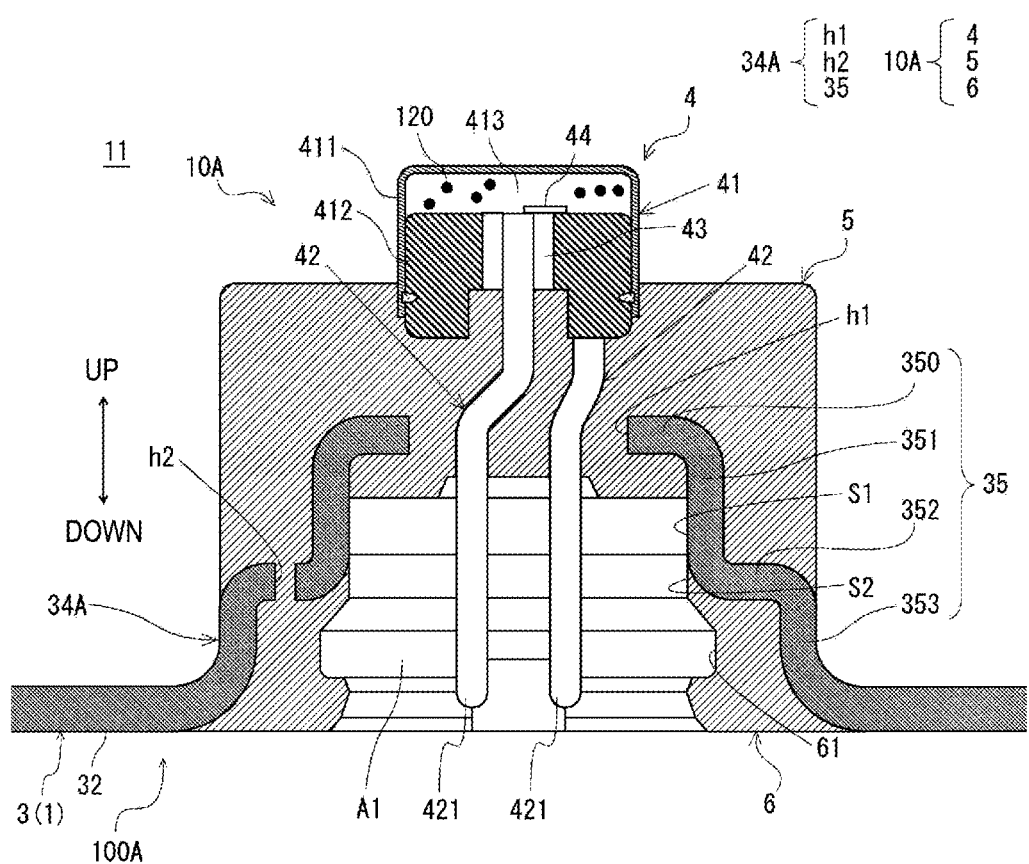
FIG. 5 is an axial cross-sectional view illustrating a vicinity of an igniter holding structure in a gas generator according to a first modified example of the first embodiment.

FIG. 5 is an axial cross-sectional view illustrating a vicinity of an igniter holding structure 10A in a gas generator 100A according to a first modified example of the first embodiment. Hereinafter, regarding the gas generator 100A and the igniter holding structure 10A, differences from the gas generator 100 and the igniter holding structure 10 will be described mainly, the same configurations are denoted by the same reference numerals and a more detailed description will be omitted. As illustrated in FIG. 5, in the gas generator 100A, a connection hole h2 that extends through from the side of the first resin portion 5 to the side of the second resin portion 6, across the circumferential wall portion 35, is formed in an attachment portion 34A in addition to the through hole h1. In the igniter holding structure 10A, the first resin portion 5 and the second resin portion 6 are connected to each other inside the connection hole h2. The connection hole h2 is provided in the connecting portion 352 that forms an annular step in the circumferential wall portion 35, and extends through from the inner side to the outer side of the circumferential wall portion 35. The first resin portion 5 and the second resin portion 6 are connected by filling the resin into the connection hole h2, and these are integrally formed. Note that, a location at which the connection hole h2 is formed in the circumferential wall portion 35 is not limited to the connecting portion 352. Furthermore, a plurality of the connection holes h2 may be formed at equal intervals in the circumferential direction of the circumferential wall portion 35.

According to the igniter holding structure 10A, by connecting the first resin portion 5 to the second resin portion 6 inside the connection hole h2, the resin inside the connection hole h2 engages with an inner surface of the connection hole h2, and rotation of the first resin portion 5 and the second resin portion 6 with respect to the attachment portion 34A can be suppressed.

Figure 6:
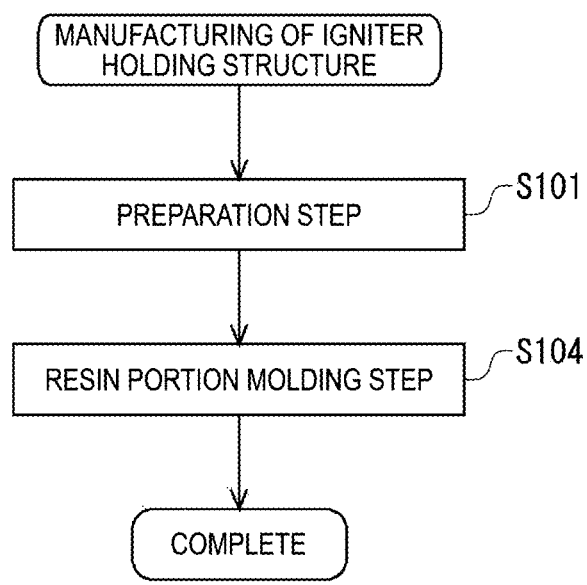
FIG. 6 is a flowchart illustrating a manufacturing process of an igniter holding structure according to a first modified example of the first embodiment.

Furthermore, FIG. 6 is a flowchart illustrating a manufacturing process of the igniter holding structure 10A according to the first modified example of the first embodiment. A manufacturing method of the igniter holding structure 10A is different from the manufacturing method of the igniter holding structure 10 illustrated in FIG. 4 in that the first resin portion 5 and the second resin portion 6 can be molded by single injection molding. In the present example, the first resin portion 5 and the second resin portion 6 are formed of the same resin material. First, in a preparation step of Step S101, the igniter 4, the lower shell 3 including the attachment portion 34A to be attached to the igniter 4, and the resin material that is a raw material for the first resin portion 5 and the second resin portion 6 are prepared, and the igniter 4 and the lower shell 3 are disposed in a molding die. At this time, the connection hole h2 is formed in the attachment portion 34A. Next, in a resin portion molding step of Step S104, the first resin portion 5 and the second resin portion 6 are injection-molded at a time by melting the resin material that is a raw material for the first resin portion 5 and the second resin portion 6 and curing the resin material after the injection molding in the die. In Step S104, the resin material in a molten state is poured from a gate for a resin material provided in the die and then cured. In Step S104, the first resin portion 5 and the second resin portion 6 are integrally formed. Here, as described above, the connection hole h2 that extends through from the side of first resin portion 5 to the side of the second resin portion 6 in the igniter holding structure 10A is formed in the attachment portion 34A of the present example. Therefore, in Step S104, the resin material that has flowed into one of the side of the first resin portion 5 and the side of the second resin portion 6 in the die can flow into the other side through the connection hole h2. According to this, since the first resin portion 5 and the second resin portion 6 can be simultaneously molded by single injection molding, the man-hours can be reduced. Furthermore, since any one of the gate for pouring the resin material from the side of the first resin portion 5 and the gate for pouring the resin material from the side of the second resin portion 6 is only required, the manufacturing equipment can be simplified.

SECOND MODIFIED EXAMPLE

Figure 7:
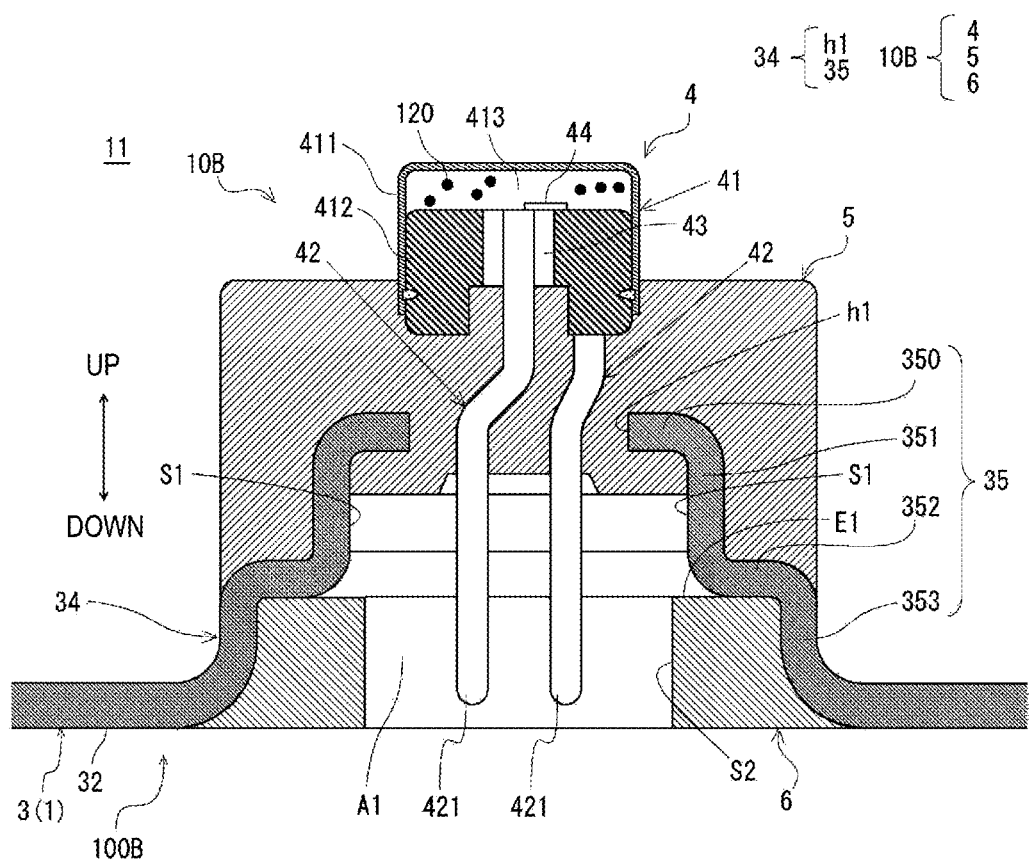
FIG. 7 is an axial cross-sectional view illustrating a vicinity of an igniter holding structure in a gas generator according to a second modified example of the first embodiment.
Figure 8:
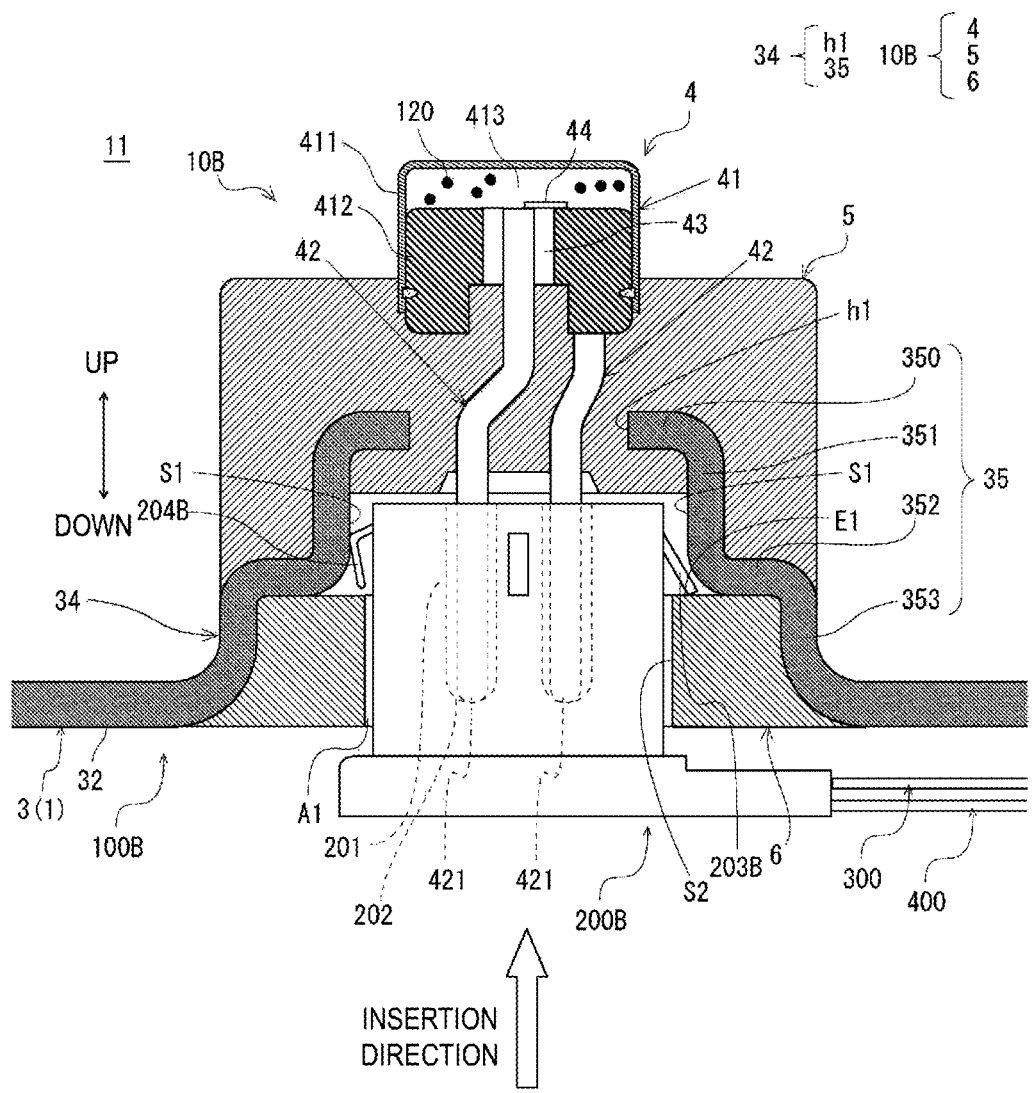
FIG. 8 is an axial cross-sectional view illustrating a state in which a connector is connected to a gas generator according to a second modified example of the first embodiment.

FIG. 7 is an axial cross-sectional view illustrating a vicinity of an igniter holding structure 10B in a gas generator 100B according to a second modified example of the first embodiment. Furthermore, FIG. 8 is an axial cross-sectional view illustrating a state in which a connector 200B is connected to the gas generator 100B according to the second modified example of the first embodiment. Hereinafter, regarding the gas generator 100B, the igniter holding structure 10B, and the connector 200B, differences from the gas generator 100, the igniter holding structure 10, and the connector 200 will be described mainly, the same configurations are denoted by the same reference numerals and a more detailed description will be omitted. As illustrated in FIG. 7, in the gas generator 100B, an engagement stepped portion E1 is formed between the exposed surface S1 and the connector introduction surface S2 in a manner that the connector introduction surface S2, which is a surface facing the connector 200B in the second resin portion 6, is located inward of the circumferential wall portion 35 further than the exposed surface S1. Furthermore, as illustrated in FIG. 8, the connector 200B applied to the igniter holding structure 10B is formed in a manner that a protrusion 203B and a ground terminal 204B protrude toward the outside of the circumferential wall portion 35 in a state in which the connector 200B is inserted into the connector insertion portion A1.

In a process in which the connector 200B is inserted into the connector insertion portion A1, the protrusion 203B and the ground terminal 204B extend over the connector introduction surface S2 while each of the protrusion 203B and the ground terminal 204B is elastically deforming inward. When the insertion of the connector 200B is completed, the protrusion 203B and the ground terminal 204B are restored to the original shape by elasticity. According to this, the protrusion 203B engages with the engagement stepped portion E1, and the ground terminal 204B comes into contact with the exposed surface S1. Since the protrusion 203B engages with the engagement stepped portion E1, removal of the connector 200B from the connector insertion portion A1 is restricted. In this way, according to the igniter holding structure 10B, the step formed between the exposed surface S1 and the connector introduction surface S2 can be used as a stopper of the connector. Note that, in the first modified example and the second modified example, which are described above, the connecting portion 352 of the circumferential wall portion 35 may form an annular inclined surface connecting the deep-side circumferential wall portion 351 to the front-side circumferential wall portion 353, and instead of the connecting portion 352 and the front-side circumferential wall portion 353, the circumferential wall portion 35 may include a circumferential wall that forms the annular inclined surface from a lower end of the deep-side circumferential wall portion 351 to the bottom plate portion 32. Furthermore, a range in which the first resin portion 5 and the second resin portion 6 cover the circumferential wall portion 35 may be the range illustrated in FIGS. 1 and 2.

THIRD MODIFIED EXAMPLE

Figure 9:
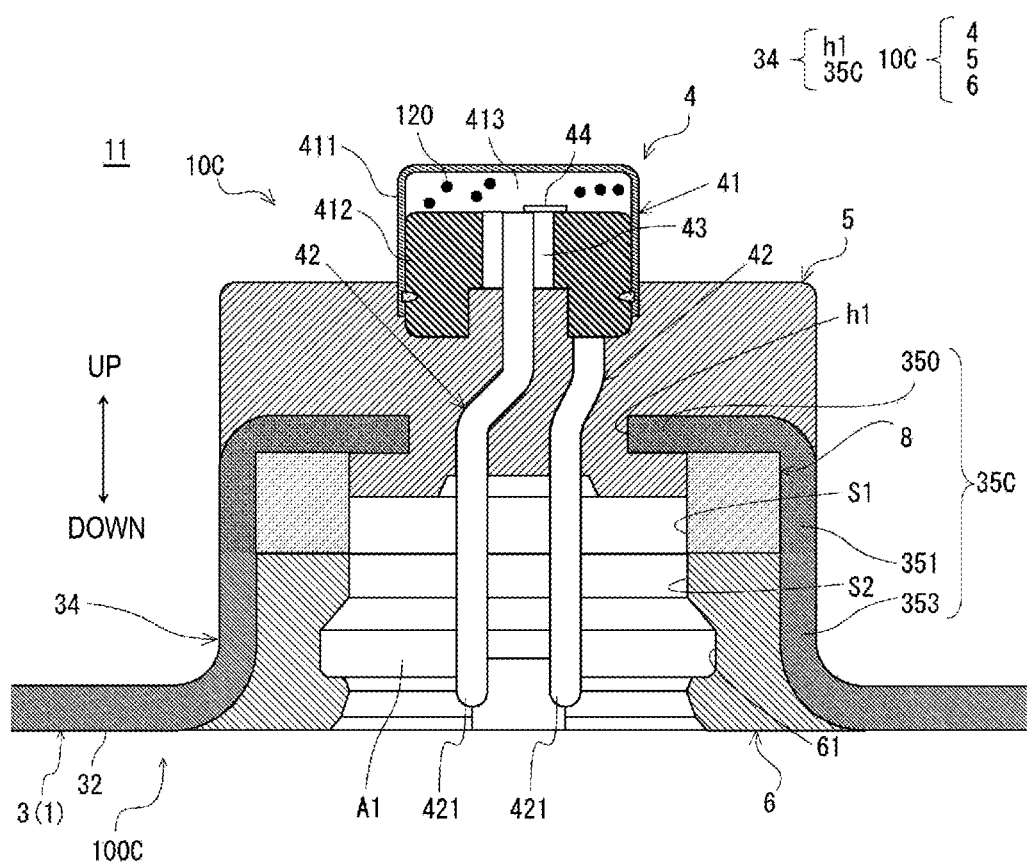
FIG. 9 is an axial cross-sectional view illustrating a vicinity of an igniter holding structure in a gas generator according to a third modified example of the first embodiment.

FIG. 9 is an axial cross-sectional view illustrating a vicinity of an igniter holding structure 10C in a gas generator 100C according to a third modified example of the first embodiment. Hereinafter, regarding the gas generator 100C and the igniter holding structure 10C, differences from the gas generator 100 and the igniter holding structure 10 will be described mainly, the same configurations are denoted by the same reference numerals and a more detailed description will be omitted. As illustrated in FIG. 9, in the igniter holding structure 10C, the exposed surface 51 is formed with an annular member 8 which is a separate member from the lower shell 3. The annular member 8 may be partially fixed to a circumferential wall portion 35C by welding. In the circumferential wall portion 35C of the gas generator 100C, the deep-side circumferential wall portion 351 in which the exposed surface 51 is formed and the front-side circumferential wall portion 353 on which the second resin portion 6 is provided are formed to have the same diameter, and the metal annular member 8 formed in the annular shape is provided on an inner side of the deep-side circumferential wall portion 351. A part of an inner surface of the annular member 8 is covered by the first resin portion 5 and the rest portion thereof is exposed to the connector insertion portion A1. The first resin portion 5 is separated from the second resin portion 6 on the inner side of the circumferential wall portion 35C to form the exposed surface S1. Since the exposed surface S1 is formed with the inner surface of the annular member 8, the front-side circumferential wall portion 353 extends toward the outside of the circumferential wall portion 35C further than the exposed surface S1. According to this, the second resin portion 6 provided on the front-side circumferential wall portion 353 can be formed thick.

Second Embodiment

Figure 10:
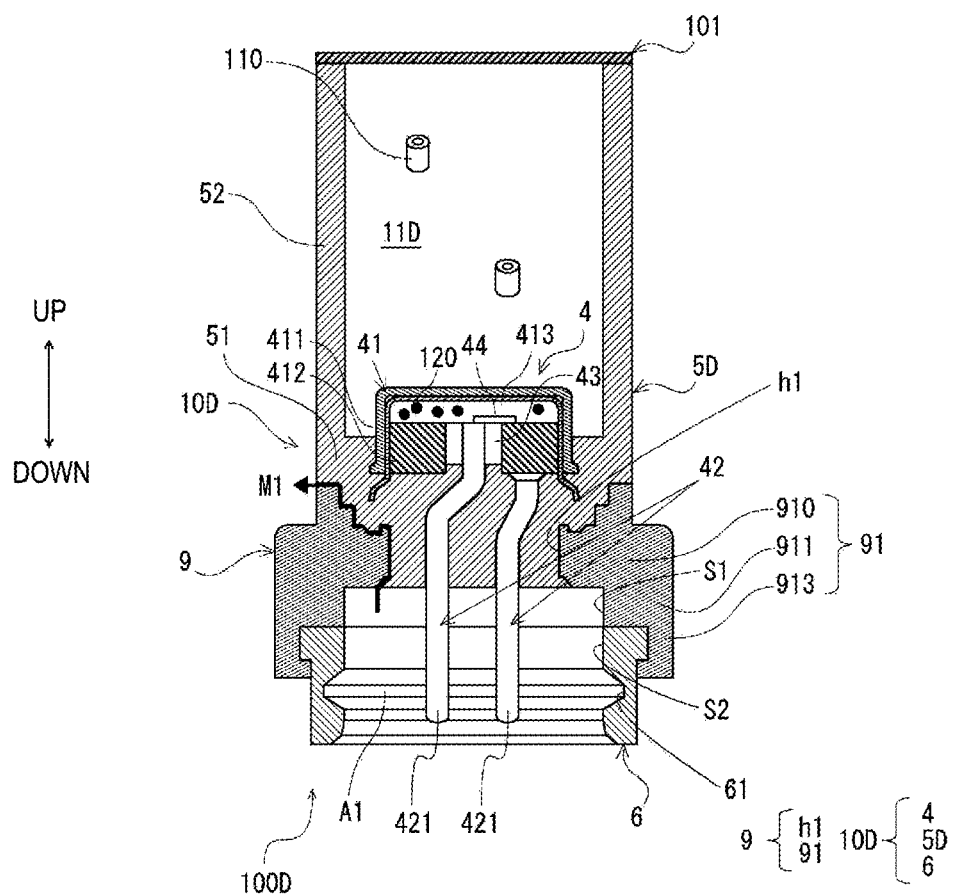
FIG. 10 is an axial cross-sectional view of a gas generator including an igniter holding structure according to a second embodiment.

Next, in a second embodiment, a case where an igniter holding structure of the present disclosure is applied to a gas generator for a seat belt retractor will be described. FIG. 10 is an axial cross-sectional view of a gas generator 100D including an igniter holding structure 10D according to the second embodiment. Hereinafter, regarding the gas generator 100D and the igniter holding structure 10D, differences from the gas generator 100 and the igniter holding structure 10 will be described mainly, the same configurations are denoted by the same reference numerals and a more detailed description will be omitted.

As illustrated in FIG. 10, the gas generator 100D includes the igniter holding structure 10D including the igniter 4, a first resin portion 5D, and the second resin portion 6, and includes also a metal collar 9, and a lid member 101. In the igniter holding structure 10D according to the second embodiment, the igniter 4 is attached to the collar 9. Furthermore, in the igniter holding structure 10D, a combustion chamber 11D in which the gas generating agent 110 is accommodated is formed with a part of the first resin portion 5D. The gas generator 100D is installed in the seat belt retractor (not illustrated) and is configured to wind up the looseness of the seat belt by operating the igniter 4 to combust the gas generating agent 110 accommodated in the combustion chamber 11D, and then discharging combustion gas which is a combustion product thereof.

As illustrated in FIG. 10, the igniter 4 is attached to the collar 9 in a state of being held by the first resin portion 5D. Furthermore, the second resin portion 6 forms the connector insertion portion A1 that is a space into which the connector (not illustrated) for supplying power (ignition current) to the igniter 4 can be inserted.

The collar 9 is a metal member formed in a cylindrical shape. The collar 9 corresponds to the "attachment portion". The through hole h1 through which the conductive pin 42 of the igniter 4 penetrates, and a circumferential wall portion 91 including the inner surface of the through hole h1 are formed in the collar 9. More specifically, a circumferential wall portion 91 includes a cylindrical hole forming portion 910 including the inner surface of the through hole h1, a cylindrical deep-side circumferential wall portion 911 having an inner diameter larger than an inner diameter of the hole forming portion 910 and extending downward from an lower end portion of the hole forming portion 910, a front-side circumferential wall portion 913 having an inner diameter larger than an inner diameter of the deep-side circumferential wall portion 911 and extending downward from an lower end portion of the deep-side circumferential wall portion 911. Due to a difference in inner diameter between the deep-side circumferential wall portion 911 and the front-side circumferential wall portion 913, an annular step is formed between the deep-side circumferential wall portion 911 and the front-side circumferential wall portion 913. Furthermore, a lower end portion of the circumferential wall portion 91 opens to a lower space of the gas generator 100D. Note that, in the following description, an inner side of the circumferential wall portion 91 and an inner side of the collar 9 refer to the inner side of a region surrounded by the circumferential wall portion 91, and also include the inner side of the through hole h1. Furthermore, an inner surface of the circumferential wall portion 91 refers to a wall surface facing inward in the circumferential wall portion 91, and also includes the inner surface of the through hole h1.

The first resin portion 5D formed of the resin material includes a holding portion 51 that holds the igniter 4, and a cylindrical portion 52 that is formed integrally with the holding portion 51 and in which the combustion chamber 11D is formed with the ignition portion 41 of the igniter 4. As illustrated in FIG. 10, the holding portion 51 fixes the igniter 4 to the collar 9 while covering the lower portion of the ignition portion 41, the upper portion of the conductive pin 42, and the inner surface of the through hole h1. The igniter 4 is held by the first resin portion 5D in a manner that the ignition portion 41 and the distal end 421 of the conductive pin 42 are located opposite each other across the through hole h1, and the conductive pin 42 is surrounded by the circumferential wall portion 91. Furthermore, the cylindrical portion 52 is formed in a cylindrical shape including one end portion connected to the holding portion 51 and the other end portion closed by the lid member 101. A part of the ignition portion 41 (portion not covered by the holding portion 51) is accommodated inside the cylindrical portion 52, and the combustion chamber 11D is formed between the ignition portion 41 and the cylindrical portion 52.

The second resin portion 6 forming the connector insertion portion A1 is formed in a cylindrical shape or an annular shape in a manner that the front-side circumferential wall portion 913 is covered by the second resin portion 6 on the inner side of the circumferential wall portion 91. In other words, the second resin portion 6 is provided separated from the first resin portion 5D on the inner side of the circumferential wall portion 91 in a manner that a part of the inner surface of the circumferential wall portion 91 is exposed to the connector insertion portion A1. According to this, an inner surface of the deep-side circumferential wall portion 911 is exposed to the connector insertion portion A1, and a metal exposed surface S1 is formed. The exposed surface S1 is formed around the entire circumference in an inner circumferential direction of the circumferential wall portion 91.

In a state in which the gas generator 100D is assembled to an automobile, the connector inserted into the connector insertion portion A1 is connected to the igniter 4, and the power can be supplied to the igniter 4. In this state, when a sensor (not illustrated) mounted in the automobile senses an impact, power from an external power source is supplied to the igniter 4, and a high-temperature flame is emitted upward from the ignition portion 41. As a result, the gas generating agent 110 of the combustion chamber 11 is ignited. Pressure of the combustion gas of the gas generating agent 110 ruptures the lid member 101, the combustion gas is discharged to the outside of the cylindrical portion 52, and the looseness of the seat belt is wound. According to this, the occupant is restrained and protected from the impact.

In the igniter holding structure 10D according to the second embodiment, the second resin portion 6 is separated from the first resin portion 5D on the inner side of the circumferential wall portion 91 in a manner that the metal exposed surface S1 exposed to the connector insertion portion A1 is formed in the circumferential wall portion 91 of the collar 9. Therefore, the same effects as that of the igniter holding structure 10 according to the first embodiment are exhibited. That is, the formation of the thin portion of the resin on the inner side of the collar 9 as the attachment portion can be suppressed. As a result, the strength of the resin on the inner side of the collar 9 can be ensured and damage to the resin can be suppressed. Furthermore, the entering of the moisture into the combustion chamber 11D due to the resin formed thin can be suitably suppressed. As a result, the dry state of the gas generating agent 110 in the combustion chamber 11D is suitably maintained, and the performance of the gas generator 100D is stabilized. Moreover, according to the igniter holding structure 10D, since the combustion chamber 11D is formed with a part of the first resin portion 5 (cylindrical portion 52), the number of parts and the assembly man-hours can be reduced. Here, an arrow indicated by reference numeral M1 in FIG. 10 represents a path of moisture entering between the collar 9 and the first resin portion 5D. In the gas generator in which the igniter is attached to the collar (attachment portion) via the resin, moisture may also enter between the attachment portion and the resin. On the other hand, in the igniter holding structure 10D, since the combustion chamber 11D is formed with a part of the first resin portion 5D, that is, the combustion chamber 11D is formed inside the first resin portion 5D, the moisture can be prevented from entering into the combustion chamber 11D between the collar 9 and the first resin portion 5D as illustrated in FIG. 10. Note that, the igniter holding structure 10D may not include the lid member 101.

MODIFIED EXAMPLE

Figure 11:
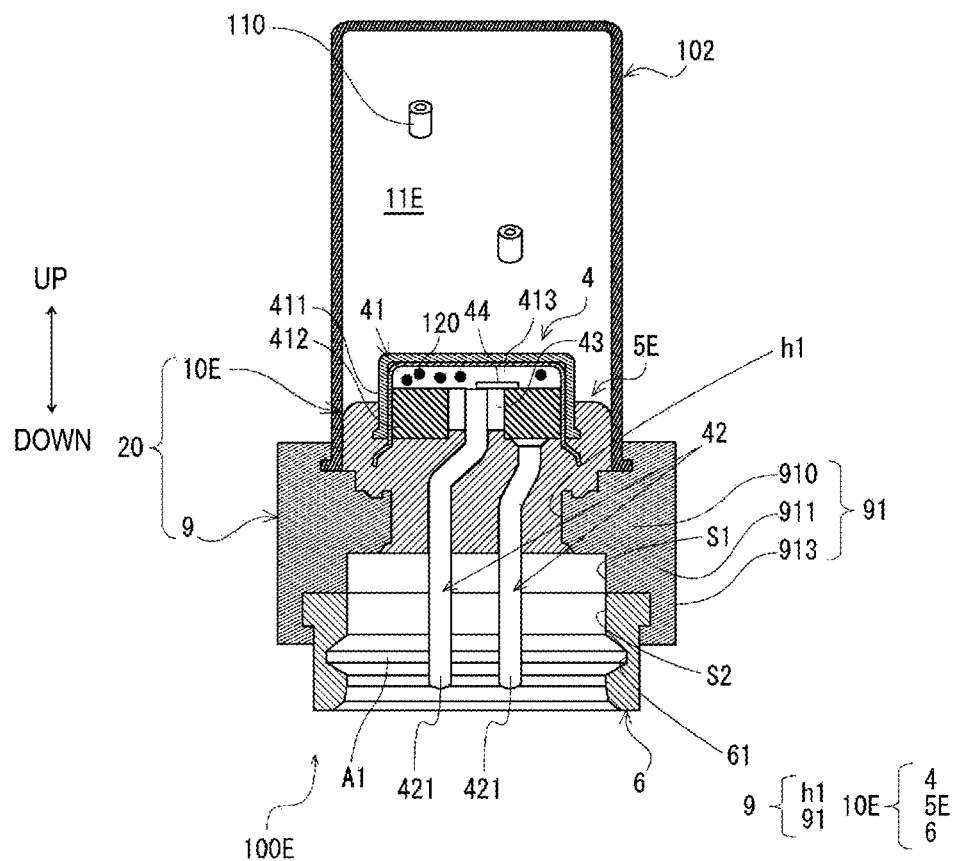
FIG. 11 is an axial cross-sectional view of a gas generator including an igniter holding structure according to a modified example of the second embodiment.

FIG. 11 is an axial cross-sectional view of a gas generator 100E including an igniter holding structure 10E according to a modified example of the second embodiment. Hereinafter, regarding the gas generator 100E and the igniter holding structure 10E, differences from the gas generator 100D and the igniter holding structure 10D will be described mainly, the same configurations are denoted by the same reference numerals and a more detailed description will be omitted. As illustrated in FIG. 11, the gas generator 100E includes the igniter holding structure 10E including the igniter 4, a first resin portion 5E, and the second resin portion 6, the collar 9, and a cup member 102. The igniter holding structure 10E is different from the igniter holding structure 10D in that a combustion chamber 11E in which the gas generating agent 110 is accommodated is formed with the cup member 102 which is a separate member from the first resin portion 5E.

The first resin portion 5E of the igniter holding structure 10E has a configuration corresponding to the first resin portion 5 of the igniter holding structure 10 and the holding portion 51 of the igniter holding structure 10D, and fixes the igniter 4 to the collar 9 while the igniter 4 is held. A configuration in which the igniter holding structure 10E and the collar 9 are combined is referred to as an igniter assembly 20.

The cup member 102 is formed in a bottomed cylindrical shape including an upper end closed and a lower end opened, and the lower end portion thereof is fixed to the collar 9 by fastening the lower end portion thereof to the inner wall of the collar 9. A part of the ignition portion 41 (portion not covered by the holding portion 51) is accommodated inside the cup member 102, and the combustion chamber 11E is formed between the ignition portion 41 and the cup member 102. When the igniter 4 is operated in the gas generator 100E, an upper end portion of the cup member 102 is ruptured by the pressure of the combustion gas of the gas generating agent 110, and the combustion gas is discharged to the outside of the cup member 102. As described above, the igniter holding structure of the present disclosure can be applied to the gas generator that forms the combustion chamber by fixing the cup member to the igniter assembly.

In the second embodiment, the case where the igniter holding structure of the present disclosure is applied to the gas generator for a seat belt retractor has been described, and the structure for attaching the igniter to the collar as the attachment portion in the second embodiment can also be applied to the gas generator for an airbag. In that case, the igniter is attached to the housing via the collar. For example, the igniter assembly described in the modified example of the second embodiment may be attached to the housing. In the gas generator illustrated in FIGS. 10 and 11, a connector provided with the ground terminal can be connected to bring the ground terminal into contact with the exposed surface. Furthermore, a connector that does not include the ground terminal may be connected and used.

OTHER EXAMPLES

Furthermore, suitable embodiments of the present disclosure have been described, but each embodiment disclosed in the present specification above can be combined with each of the features disclosed in the present specification. For example, in the example described above, the igniter holding structure has been described as a part of the gas generator, and may also be applied to an igniter (initiator) assembly that is installed in the gas generator and used, as illustrated in FIG. 1 of JP 2003-161599 A. Furthermore, the igniter holding structure of the present disclosure may also be applied to a so-called dual type gas generator provided with two igniters.

REFERENCE SIGNS LIST

1 . . . Housing
2 . . . Upper shell

3 . . . Lower shell
34 . . . Attachment portion
35 . . . Circumferential wall portion
351 . . . Deep-side circumferential wall portion
353 . . . Front-side circumferential wall portion
4 . . . Igniter
41 . . . Ignition portion
42 . . . Conductive pin
5 . . . First resin portion
51 . . . Holding portion
52 . . . Cylindrical portion
6 . . . Second resin portion
9 . . . Collar (Attachment portion)
10 . . . Igniter holding structure
20 . . . Igniter assembly
100 . . . Gas generator
200 . . . Connector
h1 . . . Through hole
h2 . . . Connection hole
S1 . . . Exposed surface
S2 . . . Connector introduction surface
A1 . . . Connector insertion portion
E1 . . . Engagement stepped portion

The invention claimed is:

1. An igniter holding structure for a gas generator, used for attaching an igniter to an attachment portion made of metal, the attachment portion including a through hole through which the igniter penetrates and a circumferential wall portion including an inner surface of the through hole, the igniter holding structure, comprising:
the igniter including an ignition portion including an ignition agent and a conductive pin extending from the ignition portion;
a first resin portion made of a resin, provided between the igniter and the attachment portion, and holding the igniter in a manner that the ignition portion and a distal end of the conductive pin are located opposite each other across the through hole and the conductive pin is surrounded by the circumferential wall portion; and
a second resin portion made of a resin and provided on the circumferential wall portion in a manner that a connector insertion portion is formed on an inner side of the circumferential wall portion, the connector insertion portion being a space for allowing a connector to be connected to the conductive pin to be inserted, wherein
the second resin portion is provided separated from the first resin portion on the inner side of the circumferential wall portion in a manner that an exposed surface made of metal and exposed to the connector insertion portion is formed in the circumferential wall portion, and
wherein the exposed surface is formed continuously around an entire circumference in an inner circumferential direction of the circumferential wall portion,
the circumferential wall portion includes a deep-side circumferential wall portion in which the exposed surface is formed, a front-side circumferential wall portion formed on a more front side than the deep-side circumferential wall portion in an insertion direction of the connector with respect to the connector insertion portion and extending toward the outside of the circumferential wall portion further than the exposed surface, and a connecting portion forming an annular step between the deep-side circumferential wall portion and the front-side circumferential wall portion by connecting the deep-side circumferential wall portion to the front-side circumferential wall portion and
the deep-side circumferential wall portion extends from the connecting portion in the insertion direction and the front-side circumferential wall portion extends from the connecting portion in a direction opposite to the insertion direction.

2. The igniter holding structure according to claim 1, wherein the exposed surface is formed as a part of the circumferential wall portion exposed to the connector insertion portion by the second resin portion separating from the first resin portion on the inner side of the circumferential wall portion.

3. The igniter holding structure according to claim 2, wherein
a connection hole extending through from a side of the first resin portion to a side of the second resin portion across the circumferential wall portion, is formed in the attachment portion, in addition to the through hole, and
the first resin portion and the second resin portion are connected to each other inside the connection hole.

4. The igniter holding structure according to claim 2, wherein
the second resin portion is provided on the front-side circumferential wall portion in a manner that insertion of the connector into the connector insertion portion is not hindered.

5. The igniter holding structure according to claim 2, wherein a connector introduction surface, which is a surface facing the connector in the second resin portion, is formed to be flush with the exposed surface.

6. The igniter holding structure according to claim 2, wherein
a stepped portion is formed between the exposed surface and a connector introduction surface in a manner that the connector introduction surface, which is a surface facing the connector in the second resin portion, is located inward of the circumferential wall portion further than the exposed surface, and
the stepped portion is formed in a manner that, in a case where the connector is inserted into the connector insertion portion, a protrusion protruding from the connector engages with the stepped portion, and this engagement restricts the connector from being removed from the connector insertion portion.

7. The igniter holding structure according to claim 2, wherein the exposed surface is formed in a manner that, in a case where the connector provided with a ground terminal is inserted into the connector insertion portion, the exposed surface is allowed to come into contact with the ground terminal.

8. The igniter holding structure according to claim 2, wherein the first resin portion includes,
a holding portion holding the igniter in a manner that the ignition portion and the distal end of the conductive pin are located opposite each other across the through hole and the conductive pin is surrounded by the circumferential wall portion, and
a cylindrical portion formed in a cylindrical shape, including one end portion connected to the holding portion and the other end portion that is closed, and including a combustion chamber in which a part of the ignition portion is accommodated and a gas generating agent to be combusted by operation of the ignition portion is accommodated, formed with the ignition portion, and
the holding portion and the cylindrical portion are integrally formed.

9. The igniter holding structure according to claim 1, wherein
a connection hole extending through from a side of the first resin portion to a side of the second resin portion across the circumferential wall portion, is formed in the attachment portion, in addition to the through hole, and
the first resin portion and the second resin portion are connected to each other inside the connection hole.

10. The igniter holding structure according to claim 9, wherein
the second resin portion is provided on the front-side circumferential wall portion in a manner that insertion of the connector into the connector insertion portion is not hindered.

11. The igniter holding structure according to claim 1, wherein
the second resin portion is provided on the front-side circumferential wall portion in a manner that insertion of the connector into the connector insertion portion is not hindered.

12. The igniter holding structure according to claim 11, wherein a connector introduction surface, which is a surface facing the connector in the second resin portion, is formed to be flush with the exposed surface.

13. The igniter holding structure according to claim 11, wherein
a stepped portion is formed between the exposed surface and a connector introduction surface in a manner that the connector introduction surface, which is a surface facing the connector in the second resin portion, is located inward of the circumferential wall portion further than the exposed surface, and
the stepped portion is formed in a manner that, in a case where the connector is inserted into the connector insertion portion, a protrusion protruding from the connector engages with the stepped portion, and this engagement restricts the connector from being removed from the connector insertion portion.

14. The igniter holding structure according to claim 1, wherein the exposed surface is formed in a manner that, in a case where the connector provided with a ground terminal is inserted into the connector insertion portion, the exposed surface is allowed to come into contact with the ground terminal.

15. The igniter holding structure according to claim 1, wherein the first resin portion includes,
a holding portion holding the igniter in a manner that the ignition portion and the distal end of the conductive pin are located opposite each other across the through hole and the conductive pin is surrounded by the circumferential wall portion, and
a cylindrical portion formed in a cylindrical shape, including one end portion connected to the holding portion and the other end portion that is closed, and including a combustion chamber in which a part of the ignition portion is accommodated and a gas generating agent to be combusted by operation of the ignition portion is accommodated, formed with the ignition portion, and
the holding portion and the cylindrical portion are integrally formed.

16. An igniter holding structure, comprising:
an igniter including an ignition portion provided with an ignition agent and a conductive pin extending from the ignition portion;
an attachment portion made of a metal and including,
a through hole through which the igniter penetrates, and
a circumferential wall portion defining in an inner side thereof a connector insertion portion for allowing a connector to be connected, the circumferential wall portion including a deep-side circumferential wall portion including an exposed surface that is exposed to the connector insertion portion at a side of the ignition portion, a front-side circumferential wall portion at a side of the conductive pin and having an inner diameter larger than an inner diameter of the deep-side circumferential wall portion, and formed on a more front side than the deep-side circumferential wall portion in an insertion direction of the connector with respect to the connector insertion portion, and a connecting portion forming an annular step between the deep-side circumferential wall portion and the front-side circumferential wall portion by connecting the deep-side circumferential wall portion to the front-side circumferential wall portion;
a first resin portion made of a resin, provided between the igniter and the attachment portion, and holding the igniter in a manner that the ignition portion and a distal end of the conductive pin are located opposite each other across the through hole and the conductive pin is surrounded by the circumferential wall portion; and
a second resin portion made of a resin and provided in the front-side circumferential wall portion, the second resin portion foil ling the connector insertion portion together with the exposed surface, the second resin portion is provided separated from the first resin portion on the inner side of the circumferential wall portion in a manner that the exposed surface is formed in the circumferential wall portion,
wherein the exposed surface is formed continuously around an entire circumference in an inner circumferential direction of the circumferential wall portion, and
the deep-side circumferential wall portion extends from the connecting portion in the insertion direction and the front-side circumferential wall portion extends from the connecting portion in a direction opposite to the insertion direction.

17. The igniter holding structure according to claim 16, comprising:
a connection hole formed in the attachment portion in order to extend through from a side of the first resin portion to a side of the second resin portion across the circumferential wall portion and though which the first resin portion and the second resin portion are connected to each other.

18. The igniter holding structure according to claim 16, wherein the exposed surface is electrically connected to a ground terminal of the connecter, when the connector provided with the ground terminal is inserted into the connector insertion portion.

19. The igniter holding structure according to claim 16, comprising:
a cylindrical portion integrally formed with the first resin portion and accommodating therein the ignition portion of the igniter and a gas generating agent.

20. A gas generator comprising the igniter holding structure according to claim 16.

21. An igniter holding structure for a gas generator, used for attaching an igniter to an attachment portion made of metal, the attachment portion including a through hole through which the igniter penetrates and a circumferential wall portion including an inner surface of the through hole, the igniter holding structure, comprising:
- the igniter including an ignition portion including an ignition agent and a conductive pin extending from the ignition portion;
- a first resin portion made of a resin, provided between the igniter and the attachment portion, and holding the igniter in a manner that the ignition portion and a distal end of the conductive pin are located opposite each other across the through hole and the conductive pin is surrounded by the circumferential wall portion; and
- a second resin portion made of a resin and provided on the circumferential wall portion in a manner that a connector insertion portion is formed on an inner side of the circumferential wall portion, the connector insertion portion being a space for allowing a connector to be connected to the conductive pin to be inserted, wherein
- the second resin portion is provided separated from the first resin portion on the inner side of the circumferential wall portion in a manner that an exposed surface made of metal and exposed to the connector insertion portion is formed in the circumferential wall portion, and
- the circumferential wall portion includes:
- a deep-side circumferential wall portion in which the exposed surface is formed,
- a front-side circumferential wall portion formed on a more front side than the deep-side circumferential wall portion in an insertion direction of the connector with respect to the connector insertion portion and extending toward the outside of the circumferential wall portion further than the exposed surface,
- a connecting portion forming an annular step between the deep-side circumferential wall portion and the front-side circumferential wall portion by connecting the deep-side circumferential wall portion to the front-side circumferential wall portion, and
- the deep-side circumferential wall portion extends from the connecting portion in the insertion direction and the front-side circumferential wall portion extends from the connecting portion in a direction opposite to the insertion direction.

22. An igniter holding structure for a gas generator, used for attaching an igniter to an attachment portion made of metal, the attachment portion including a through hole through which the igniter penetrates and a circumferential wall portion including an inner surface of the through hole, the igniter holding structure, comprising:
- the igniter including an ignition portion including an ignition agent and a conductive pin extending from the ignition portion;
- a first resin portion made of a resin, provided between the igniter and the attachment portion, and holding the igniter in a manner that the ignition portion and a distal end of the conductive pin are located opposite each other across the through hole and the conductive pin is surrounded by the circumferential wall portion, the first resin portion covers a hole forming portion of the through hole and a part of an inner side of the circumferential wall portion below the through hole; and
- a second resin portion made of a resin and provided on the circumferential wall portion in a manner that a connector insertion portion is formed on an inner side of the circumferential wall portion, the connector insertion portion being a space for allowing a connector to be connected to the conductive pin to be inserted, wherein
- the second resin portion is provided separated from the first resin portion on the inner side of the circumferential wall portion in a manner that an exposed surface made of metal and exposed to the connector insertion portion is formed in the circumferential wall portion,
- the circumferential wall portion includes:
- a deep-side circumferential wall portion in which the exposed surface is formed,
- a front-side circumferential wall portion formed on a more front side than the deep-side circumferential wall portion in an insertion direction of the connector with respect to the connector insertion portion and extending toward the outside of the circumferential wall portion further than the exposed surface,
- a connecting portion forming an annular step between the deep-side circumferential wall portion and the front-side circumferential wall portion by connecting the deep-side circumferential wall portion to the front-side circumferential wall portion, and
- the deep-side circumferential wall portion extends from the connecting portion in the insertion direction and the front-side circumferential wall portion extends from the connecting portion in a direction opposite to the insertion direction.

* * * * *